United States Patent [19]

Hamada et al.

[11] Patent Number: 5,013,525
[45] Date of Patent: May 7, 1991

[54] STEEL FOR CORROSION-RESISTANT ROLLING PART AND ROLLING PART

[75] Inventors: Kaneaki Hamada; Kazuichi Tsubota, both of Himeji; Tomoki Muraoka, Fujisawa, all of Japan

[73] Assignees: Sanyo Special Steel Co., Ltd.; Nippon Seiko Kabushiki Kaisha, both of Japan

[21] Appl. No.: 442,259

[22] Filed: Nov. 28, 1989

[30] Foreign Application Priority Data

Dec. 9, 1988 [JP] Japan .................................. 63-311357

[51] Int. Cl.⁵ .............................................. C22C 38/18
[52] U.S. Cl. ...................................... 420/104; 420/90; 420/105; 148/333; 148/334; 148/906
[58] Field of Search ........................ 420/104, 105, 90; 148/906, 333, 334

[56] References Cited

U.S. PATENT DOCUMENTS 4,729,872 3/1988 Kishida et al. ...................... 420/105

FOREIGN PATENT DOCUMENTS 52-16418 2/1977 Japan .................................. 420/105

*Primary Examiner*—Deborah Yee
*Attorney, Agent, or Firm*—Wenderoth, Lind & Ponack

[57] ABSTRACT

The present invention provides a steel for a corrosion-resistant rolling part having excellent corrosion resistance, high quenching and tempering hardness, and excellent workability for use in linear bearings, ball screws and rolling bearings of industrial machinery which must be strictly prevented from undergoing environmental contamination due to oil and grease. The steel comprises 0.5% or more and 0.7% or less by weight of carbon, 0.1% or more and 1.5% or less by weight of silicon, 0.1% or more and 2.0% or less by weight of manganese, 3.0% or more and less than 6.0%, preferably 4.0% or more and 5.5% or less, by weight of chromium, 0.05% or less by weight of phosphorus, 0.03% or less, preferably 0.01% or less, by weight of sulfur and 0.0015% or less by weight of oxygen, and may further comprise at least one of 0.05% or more and 2.0% or less, preferably 0.05% or more and 1.0% or less, by weight of molybdenum and 0.1% or more and 0.8% or less, preferably 0.2% or more and 0.8% or less, by weight of copper, with the balance being iron and unavoidable impurities.

8 Claims, 3 Drawing Sheets

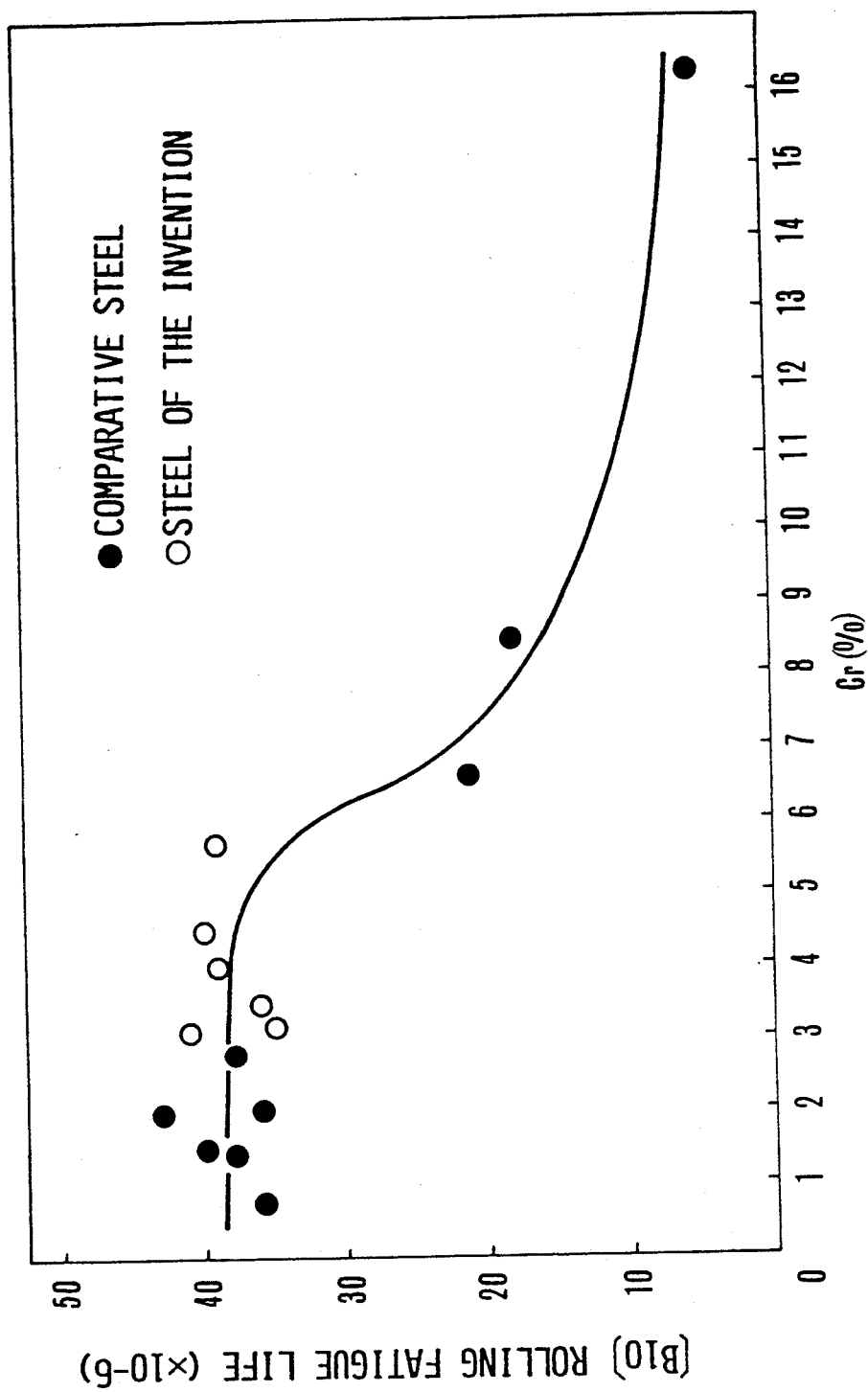

STEEL FOR CORROSION-RESISTANT ROLLING PART AND ROLLING PART

BACKGROUND OF THE INVENTION

1. Field of the Invention

The present invention relates to a steel for a rolling part having excellent corrosion resistance, high quenching and tempering hardness, and excellent machinability for use in linear bearings, ball screws and roller bearings of industrial machinery including NC lathe, semiconductor manufacturing equipment and apparatus for office automation which must be strictly prevented from undergoing environmental contamination due to oil and grease, and further relates to a rolling part made from such steel.

2. Description of the Prior Art

A high hardness material having excellent corrosion resistance is required of the linear bearing used for NC lathe, semiconductor device and apparatus for office automation, ball screws and roller bearings used for medical apparatus and precision instruments, and martensitic stainless steel, such as SUS440C (corresponding to SAE 51440C), have hitherto been used for this purpose. However, these steels have a drawback of being poor in rolling fatigue life and machinability due to formation of a large number of coarse carbides.

By contrast, high-carbon and low-chromium bearing steels (SUJ2 series corresponding to SAE 52100 series) exhibit excellent rolling fatigue life characteristics and machinability but are poor in corrosion resistance, so that they could not be used for the above-described applications.

For the above reasons, development of a material satisfying all of the requirements for corrosion resistance, rolling fatigue life, and machinability has been strongly desired.

OBJECT OF THE INVENTION

The present invention has been made with a view to solving the problems of the above-described prior art. It is an object of the present invention to provide a steel for a corrosion-resistant rolling part having improved rolling fatigue life and machinability through suppression of formation of coarse carbides while maintaining excellent corrosion resistance and high quenching and tempering hardness.

The present inventors have made various studies for improvement of quenched and tempered high-carbon martensitic stainless steel (SUS440C series) and high-carbon and low-chromium bearing steel (SUJ2 series). As a result, the present inventors have found that a steel for a corrosion-resistant rolling part free from formation of coarse carbides can be produced while maintaining excellent corrosion resistance and quenching and tempering hardness by adopting a carbon content of 0.5% or more and 0.7% or less by weight and a chromium content of 3.0% or more and less than 6.0% by weight and, preferably, adding 2.0% or less by weight of molybdenum and/or 0.8% or less by weight of copper to these components. This discovery has led to the completion of the present invention.

SUMMARY OF THE INVENTION

The invention firstly provides a steel for a corrosion-resistant rolling part comprising 0.5% or more and 0.7% or less by weight of carbon, 0.1% or more and 1.5% or less by weight of silicon, 0.1% or more and 2.0% or less by weight of manganese, 3.0% or more and less than 6.0% by weight of chromium, 0.05% or less by weight of phosphorus, 0.03% or less by weight of sulfur, and 0.0015% or less by weight of oxygen, with the balance being iron and unavoidable impurities.

The invention secondly provides a steel for a corrosion-resistant rolling part comprising 0.5% or more and 0.7% or less by weight of carbon, 0.1% or more and 1.5% or less by weight of silicon, 0.1% or more and 2.0% or less by weight of manganese, 3.0% or more and less than 6.0% by weight of chromium, 0.05% or less by weight of phosphorus, 0.03% or less by weight of sulfur, 0.0015% or less by weight of oxygen, and further comprising one or both of 0.05% or more and 2.0% or less by weight of molybdenum and 0.1% or more and 0.8% or less by weight of copper, with the balance being iron and unavoidable impurities.

The invention thirdly provides a steel for a corrosion-resistant rolling part comprising: 0.5% or more and 0.7% or less by weight of carbon, 0.1% or more and 1.5% or less by weight of silicon, 0.1% or more and 2.0% or less by weight of manganese, 4.0% or more and 5.5% or less by weight of chromium, 0.05% or less by weight of phosphorus, 0.01% or less by weight of sulfur, and 0.0015% or less by weight of oxygen, with the balance being iron and unavoidable impurities.

The invention fourthly provides a steel for a corrosion-resistant rolling part comprising: 0.5% or more and 0.7% or less by weight of carbon, 0.1% or more and 1.5% or less by weight of silicon, 0.1% or more and 2.0% or less by weight of manganese, 4.0% or more and 5.5% or less by weight of chromium, 0.05% or less by weight of phosphorus, 0.01% or less by weight of sulfur, 0.0015% or less by weight of oxygen, and further comprising one or both of 0.05% or more and 1.0% or less by weight of molybdenum and 0.2% or more and 0.8% or less by weight of copper, with the balance being iron and unavoidable impurities.

The invention further provides a rolling part made from the steel according to the above-described first, second, third or fourth aspects of the invention.

Now, the reason for the limitation of the components of the present invention to the above-described ranges will be described. In the following description, "%" used in the present specification is "% by weight", unless otherwise specified.

C (carbon):

A steel for a rolling part must have an improved rolling fatigue life. For this reason, it is preferred to attain a quenching and tempering hardness of about HRC 60. In the present invention, carbon is incorporated for this purpose. Further, in the present invention, since 0.5% or more of carbon is necessary for attaining a quenching and tempering hardness of HRC 60 or more, the lower limit of the carbon content is set as 0.5%

Although a higher carbon content can afford a higher hardness, too high a carbon content gives rise to coarse carbides as shown in FIG. 1, which brings about lowering in the corrosion resistance, rolling fatigue life and machinability. Since the upper limit of the carbon content which does not bring about formation of coarse carbides is 0.7% in the steel of the present invention having a chromium content of less than 6.0% and/or a molybdenum content of 2.0% or less, the upper limit of the carbon content is set as 0.7%.

Si (silicon):

Silicon contained in the steel is effective in hardening a solid solution and improving the resistance to temper softening. In the steel of the present invention, this effect is low when the silicon content is less than 0.1%, while when the silicon content exceeds 1.5%, decarburization becomes remarkable during heat treatment. In view of the above, the lower limit and the upper limit of the silicon content are set as 0.1% and 1.5%, respectively.

Mn (manganese):

Manganese contained in the steel plays an important role for adjusting the hardenability. In the steel of the present invention, this effect becomes significant when the manganese content is 0.1% or more, while when the content exceeds 2.0%, the machinability becomes poor. In view of the above, the lower limit and the upper limit of the manganese content are set as 0.1% and 2.0%, respectively.

Cr (chromium):

Chromium is an element indispensable for improving the corrosion resistance. As shown in Table 2 and FIG. 2, in the present invention, no sufficient effect can be attained when the chromium content is less than 3.0%. In view of the above, the lower limit is set as 3.0%, preferably 4.0% or more.

Although a higher chromium content brings about more improved corrosion resistance, the rolling fatigue life is lowered when the chromium content is 6.0% or more as shown in FIG. 3. In view of the above, the upper limit is set below 6.0%.

The preferable range of the chromium content is 4.0% or more and 5.5% or less by weight. This is because more improved corrosion resistance and more improved rolling fatigue life can be attained in this range in a reliable manner, as seen from FIG. 2 and FIG. 3. In the range of 5.5% or less, the rolling fatigue life is improved and the coarse carbides can be more reliably suppressed, while the corrosion resistance can be improved.

P (phosphorus):

In the steel of the present invention, since the rolling fatigue life is deteriorated when the phosphorus content exceeds 0.05%, the upper limit of the phosphorus is set as 0.05%.

S (sulfur):

In the steel of the present invention, sulfur exists mainly in the form of a sulfide. In the present invention, the sulfide improves the machinability of the steel. In the case of a miniature bearing, however, the sulfide not only brings about generation of noise but also remarkably lowers the corrosion resistance. In view of the above, the upper limit of the sulfur content is set as 0.03%, preferably 0.01% or less.

In the range of 0.01% or less, the sulfide content is reduced, whereby the generation of noise is reduced and stably held in the reduced state.

O (oxygen):

In the steel of the present invention, when the oxygen content exceeds 0.0015%, the amount of an oxide remarkably increases, which remarkably lowers the rolling fatigue life. In view of the above, the upper limit of the oxygen content is set as 0.0015%.

Mo (molybdenum) and Cu (copper):

In the second and fourth aspects of the invention, one or both of molybdenum and copper are incorporated in the steel, in addition to the other elements recited in the first and third aspects of the invention.

Molybdenum is effective in further improving the corrosion resistance and hardenability. However, as shown in FIG. 1, the molybdenum content exceeding 2.0% causes formation of coarse carbides, while the molybdenum content of at least 0.05% is required to improve the hardenability. In view of the above, the upper limit of the molybdenum content is set as 2.0% and the lower limit of the molybdenum content is set as 0.05%. The preferable range of the molybdenum content is 0.05% to 1.0%. This is because at least 0.05% of molybdenum content is required to improve the hardenability and corrosion resistance, as described above, while the molybdenum content of 1.0% or less is preferred to surely avoid deposition of coarse carbide which exerts considerable adverse effects on the improvement of the corrosion resistance and noise.

Copper is effective in further improving the corrosion resistance without causing formation of coarse carbides. When copper is added in an amount exceeding 0.8%, hot workability is remarkably lowered. In view of the above, the upper limit of the copper content is set as 0.8%. The copper content is preferably 0.2 to 0.8%.

In fact, when the copper content exceeds 0.2%, the corrosion resistance (weather resistance) considerably increases but if the copper content is excessively increased so that it exceeds 0.8%, the hot workability is lowered until large cracks on the surface of the steel may be produced.

BRIEF DESCRIPTION OF THE DRAWINGS

FIG. 3 is a graph showing the relationship between the chromium content and the rolling fatigue life for a material under test having an oxygen content of 0.0015% or less and a phosphorus content of 0.05% or less.

DETAILED DESCRIPTION OF THE PREFERRED EMBODIMENTS

Figure 1:
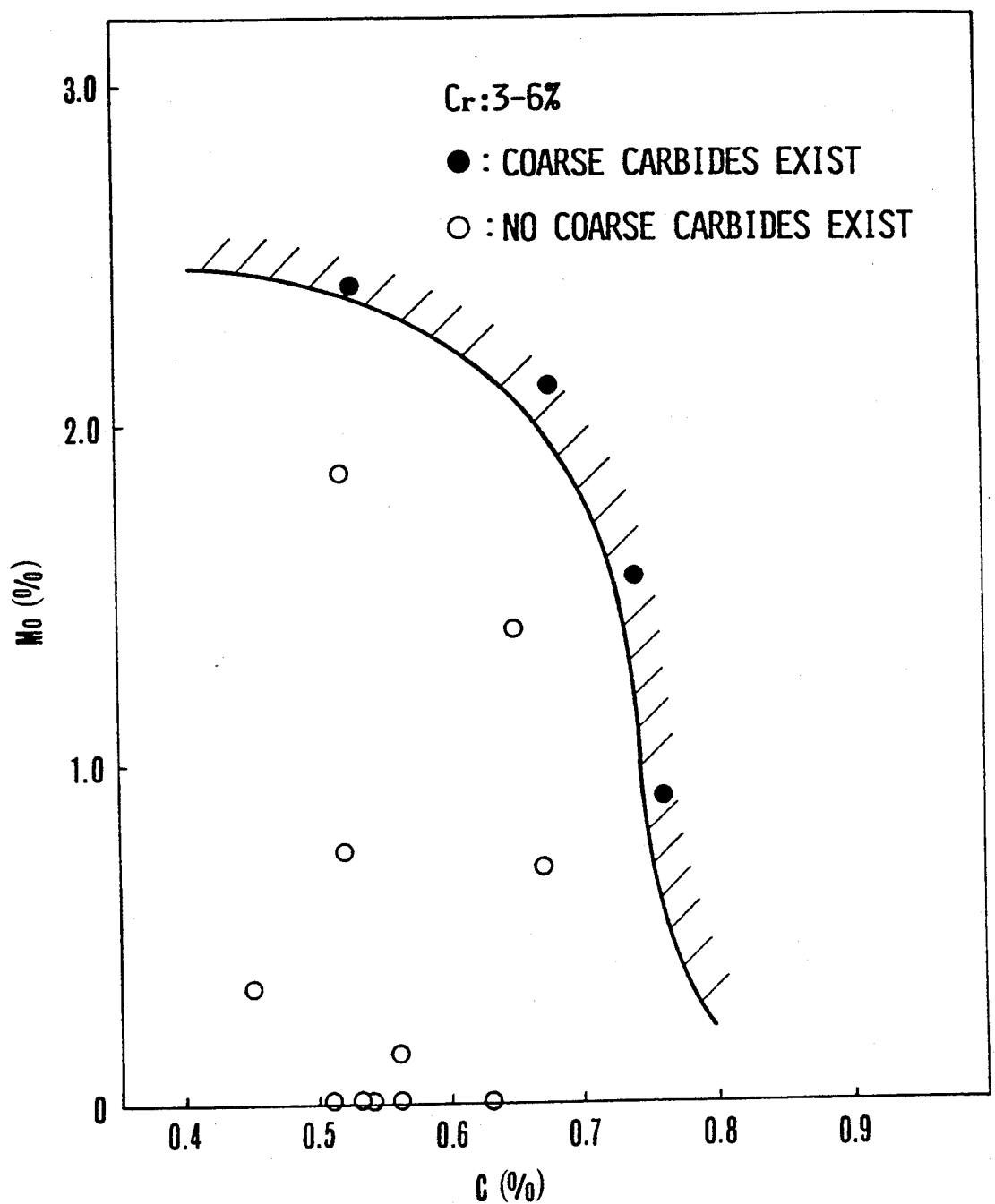
FIG. 1 is a graph showing the effect of carbon and molybdenum in a steel with a chromium content of 3.0% or more and less than 6.0%, on the formation of coarse carbides.

The present invention will now be described in more detail by way of Examples and Comparative Examples.

The chemical compositions of the tested comparative and conventional steels (Nos. A1 to A18) and the steels of the present invention (Nos. B1 to B6), i.e., 24 heats in total, are shown in Table 1.

All of the heats were prepared in an amount of 100 kg by melting the components in a vacuum melting furnace. The ingot thus prepared was subjected to soaking followed by forging to obtain a size of φ65 and φ32. Before each test piece is subjected to quenching and tempering, the quenching and tempering characteristics were examined to determine a quenching temperature at which the maximum hardness can be attained by tempering at 160° C for 90 min. The quenching and tempering conditions of each test piece were conducted based on the results of the examination.

TABLE 1

| | | Chemical Compositions of Material Tested | | | | | | | | | (% by weight) |
|---|---|---|---|---|---|---|---|---|---|---|---|
| Kind | No. | C | Si | Mn | P | S | Cr | Mo | Cu | O | Remarks |
| Comparative Steel (Conventional Steel) | A1 | 0.45 | 0.70 | 0.80 | 0.031 | 0.020 | 5.61 | 0.34 | 0.08 | 0.0012 | |
| | A2 | 0.51 | 0.08 | 0.32 | 0.023 | 0.002 | 4.18 | 0.03 | 0.02 | 0.0010 | |
| | A3 | 0.52 | 0.21 | 0.05 | 0.015 | 0.024 | 5.30 | 0.74 | 0.23 | 0.0008 | |
| | A4 | 0.52 | 1.38 | 0.59 | 0.057 | 0.008 | 3.75 | 1.85 | 0.02 | 0.0011 | |
| | A5 | 0.56 | 0.78 | 1.88 | 0.040 | 0.043 | 4.31 | 0.15 | 0.01 | 0.0020 | |
| | A6 | 0.53 | 0.35 | 0.48 | 0.025 | 0.011 | 3.02 | 2.40 | 0.34 | 0.0009 | |
| | A7 | 0.68 | 0.47 | 1.54 | 0.020 | 0.015 | 4.24 | 2.11 | 0.22 | 0.0007 | |
| | A8 | 0.74 | 1.23 | 0.35 | 0.022 | 0.010 | 4.76 | 1.55 | 0.29 | 0.0008 | |
| | A9 | 0.76 | 0.33 | 0.67 | 0.010 | 0.002 | 3.06 | 0.90 | 0.11 | 0.0010 | |
| | A10 | 0.53 | 0.15 | 0.91 | 0.019 | 0.007 | 0.74 | 0.01 | 0.02 | 0.0006 | |
| | A11 | 0.68 | 0.92 | 0.78 | 0.030 | 0.011 | 1.97 | 0.03 | 0.03 | 0.0008 | |
| | A12 | 0.58 | 0.80 | 0.35 | 0.015 | 0.003 | 2.80 | 0.02 | 0.03 | 0.0009 | |
| | A13 | 0.52 | 1.11 | 0.57 | 0.024 | 0.011 | 6.60 | 0.02 | 0.02 | 0.0007 | |
| | A14 | 0.53 | 0.68 | 0.20 | 0.022 | 0.005 | 8.47 | 0.03 | 0.04 | 0.0008 | |
| | A15 | 1.01 | 0.35 | 0.41 | 0.029 | 0.010 | 16.25 | 0.51 | 0.04 | 0.0012 | SUS440C |
| | A16 | 0.98 | 0.27 | 0.37 | 0.025 | 0.008 | 1.41 | 0.03 | 0.04 | 0.0005 | SUJ2 |
| | A17 | 0.57 | 0.41 | 0.51 | 0.021 | 0.012 | 1.52 | 0.74 | 0.03 | 0.0008 | |
| | A18 | 0.64 | 0.35 | 0.87 | 0.015 | 0.015 | 2.02 | 1.24 | 0.62 | 0.0007 | |
| Steel of the Present Invention | B1 | 0.53 | 0.74 | 0.53 | 0.020 | 0.003 | 3.22 | 0.02 | 0.04 | 0.0011 | Steel of First Invention |
| | B2 | 0.63 | 1.32 | 0.77 | 0.017 | 0.018 | 4.53 | 0.01 | 0.03 | 0.0006 | Steel of First Invention |
| | B3 | 0.56 | 0.54 | 0.92 | 0.018 | 0.005 | 5.70 | 0.02 | 0.04 | 0.0006 | Steel of First Invention |
| | B4 | 0.65 | 0.67 | 1.76 | 0.026 | 0.007 | 3.51 | 1.40 | 0.03 | 0.0009 | Steel of Second Invention |
| | B5 | 0.54 | 0.84 | 0.31 | 0.015 | 0.003 | 3.10 | 0.02 | 0.74 | 0.0008 | Steel of Second Invention |
| | B6 | 0.67 | 0.41 | 1.24 | 0.016 | 0.006 | 4.03 | 0.70 | 0.35 | 0.0007 | Steel of Second Invention |

Figure 2:
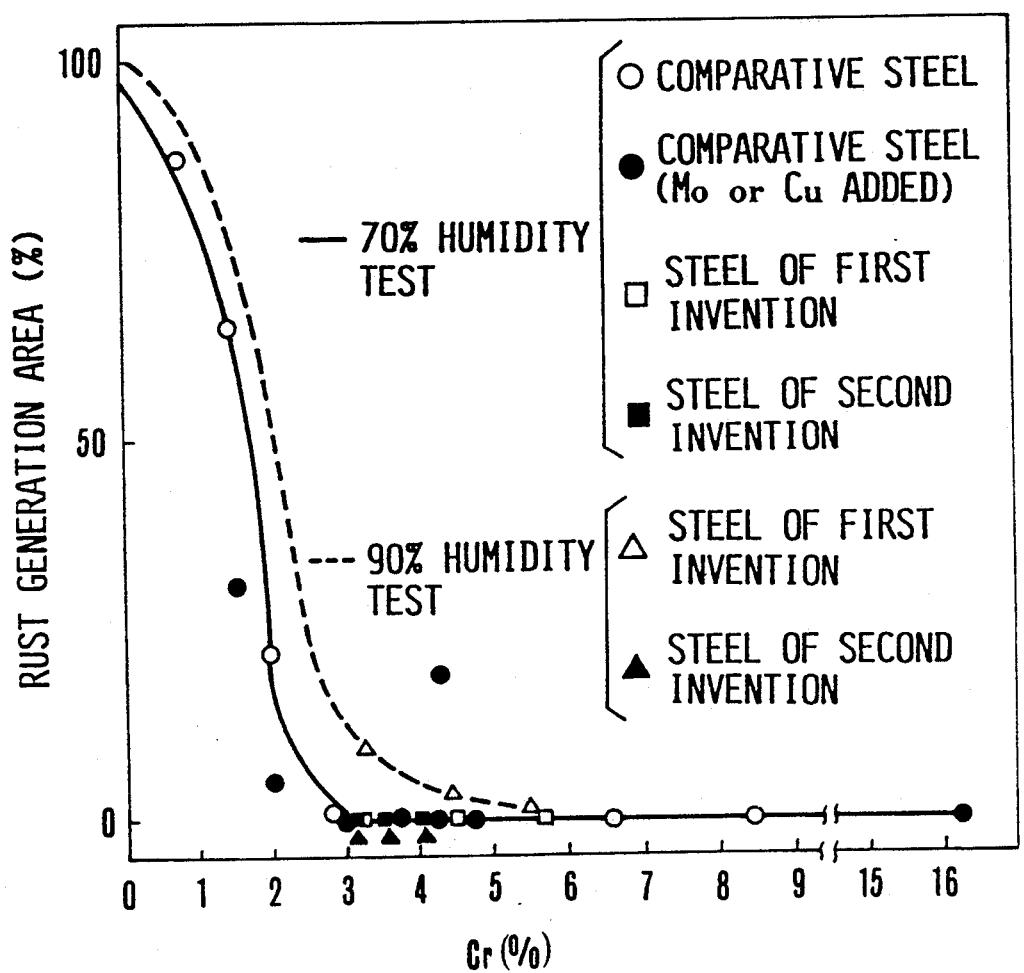
FIG. 2 is a graph showing the relationship between the chromium content and the percentage of rust generation area.

The hardness after quenching and tempering is shown in Table 2. The hardness was measured at a point 5 mm below the surface of the sample. It is apparent that the heats (A2 and A3) having low silicon and manganese contents, which have been poorly quenched, do have not sufficient hardness at their inside portions.

of the percentage of the rust generation relative area to the examined area by making use of an image analysis device. In this case, a sample wherein no spot corrosion occurred was regarded as being free from rust generation even when slight discoloration was observed. The results are shown in Table 2 and FIG. 2. The heats

TABLE 2

| | | Various Characteristics after Quenching and Tempering | | | | | |
|---|---|---|---|---|---|---|---|
| | | | Percentage of Rust Generation Area (%) | | Rolling Fatigue | Number of Coarse Carbides | Surface Roughness of Rolling Surface after |
| Kind | No. | Hardness (HRC) | 70% Humidity Test | 90% Humidity Test | Life ($\times 10^6$) | Having a Diameter of 5 μm or more | Surface Grinding (μmRmax) |
| Comparative Steel (Conventional Steel) | A1 | 57.2 | 0 | — | 1 | 0 | 4.5 |
| | A2 | 58.4 | 0 | — | 3 | 0 | 3.8 |
| | A3 | 58.7 | 0 | — | 3 | 0 | 4.2 |
| | A4 | 60.7 | 0 | — | 8 | 0 | 3.3 |
| | A5 | 61.1 | 19 | — | 7 | 0 | 3.0 |
| | A6 | 60.4 | 0 | — | 4 | 34 | 4.1 |
| | A7 | 61.8 | 0 | — | 8 | 89 | 4.5 |
| | A8 | 62.3 | 0 | — | 9 | 212 | 4.7 |
| | A9 | 62.5 | 0 | — | 12 | 133 | 4.0 |
| | A10 | 60.9 | 87 | — | 36 | 0 | 3.0 |
| | A11 | 62.1 | 22 | — | 43 | 0 | 2.1 |
| | A12 | 61.8 | 1 | — | 38 | 0 | 2.5 |
| | A13 | 60.7 | 0 | — | 21 | 0 | 2.5 |
| | A14 | 60.1 | 0 | — | 18 | 0 | 2.3 |
| | A15 | 60.2 | 0 | — | 5 | 316 | 5.0 |
| | A16 | 62.3 | 65 | — | 38 | 0 | 3.5 |
| | A17 | 61.3 | 31 | — | 40 | 0 | 3.2 |
| | A18 | 61.5 | 5 | — | 36 | 0 | 2.7 |
| Steel of the Present Invention | B1 | 60.9 | 0 | 10 | 35 | 0 | 2.5 |
| | B2 | 61.8 | 0 | 3 | 40 | 0 | 2.2 |
| | B3 | 61.2 | 0 | 1 | 39 | 0 | 2.2 |
| | B4 | 62.0 | 0 | 0 | 36 | 0 | 2.1 |
| | B5 | 61.6 | 0 | 0 | 41 | 0 | 2.2 |
| | B6 | 62.3 | 0 | 0 | 39 | 0 | 2.1 |

The corrosion resistance test was conducted by a humidity test wherein a cycle of 20° C.×1.5 hr and 50° C.×4.5 hr was repeated with a constant relative humidity of 70%. The cycle was repeated ten times. After the experiment, the sample was subjected to measurement (A10, A11, A12 and A16) having a chromium content of less than 3% and the heat (A5) having a high sulfur content are remarkably poor in the corrosion resistance.

Further, no rust is generated when the chromium content is 3.0% or more.

Further, for the steel of the present invention, the same humidity test as that described above was conducted under severer conditions, i.e., a relative humidity of 90%. The results are shown in Table 2 and FIG. 2. As is apparent therefrom, no rust occurred in the case of steels of examples (B4, B5 and B6) of the second and fourth aspects of the invention wherein molybdenum and copper had been added.

The coarse carbides exert an adverse effect on the rolling fatigue life, corrosion resistance, and machinability. In this regard, the observation of the carbides was conducted on the assumption that the carbides had pseudoelliptical shape and the average of the major axis and the minor axis was regarded as the diameter of said pseudoelliptical shape. As the result, it was found that when the number of the carbides having a diameter of 5 μm or more increases, the above-described adverse effect is increased. For this reason, the number of carbides having a diameter of 5 μm or more was measured. The total measuring area was $1.125 \times 10^6$ μm2 (50 fields of view). The results are shown in Table 2 and FIG. 1. In the case of a chromium content in the range of 3.0 to 6.0%, the coarse carbides were observed in a heat having a carbon content exceeding 0.7% and/or a heat having a molybdenum content exceeding 2.0%.

The rolling fatigue life test was conducted, using a thrust-type rolling fatigue life testing machine, under conditions of a Hertz maximum contact stress; Pmax, of 500 kgf/mm$^2$ and a number of stress cycles of 1800 cpm in a #68 turbine oil bath.

The number of stress cycles was measured on 20 test pieces for each heat, and the $B_{10}$ life values obtained were compared with each other. The results are shown in Table 2 and FIG. 3. As is apparent therefrom, a heat having a high phosphorus or oxygen content and a heat having a chromium content of 6.0% or more have a remarkably low life. By contrast, the steel of the present invention has high hardness and excellent life without causing formation of coarse carbides.

The ground surface roughness test was conducted as follows. In preparing a quenched and tempered test piece (with an outer diameter of φ60, a thickness of 7 mm and a rolling surface roughness of 0.06 Ra max. in a finished state) for use in the rolling fatigue life test, grinding was conducted as pre-working with a vertical duplex head grinding machine by making use of an aluminum oxide grinding wheel (a grain size of #60; φ=300) under conditions of a number of revolutions of 1700 rpm in the main shaft of the grinding wheel and a feed rate of a water-soluble cutting solution of 100 to 150 l/min. Thereafter, the surface roughness of the rolling surface of the test piece was measured, and the results are shown in Table 2. In this table, the comparative and conventional steels (A6 to A9 and A15) which have a large in the number of coarse carbides having a diameter of 5 μm or more are inferior in the surface roughness to A16 (SUJ2) which is a representative conventional steel. By contrast, all of the steels B1 to B6 according to the present invention are superior to A16 in the surface roughness and exhibit excellent machinability. It is believed that poor surface roughness of the comparative and conventional steels A1 to A3 is due to low hardness of the test pieces after quenching and tempering. From these results, it has been found that in the chromium content range of 3.0% or more and less than 6.0%, the surface roughness after grinding is worsened with an increase in the number of coarse carbides having a diameter of 5 μm or more which undergo an influence of the carbon and molybdenum contents, which brings about a lowering in the machinability.

The rolling parts according to the present invention can be stored for a long period of time without generation of rust even in such places as NC lathe, semiconductor manufacturing equipment and apparatus for office automation where environmental contamination due to oil and grease is extremely unfavorable, i.e., even in those places where a rust preventive oil for storing cannot be used.

As described above, the steel of the present invention can reduce the number of coarse carbides while maintaining the corrosion resistance satisfying specific requirements, has sufficient quenching and tempering hardness, and is superior to the conventional steel in rolling fatigue life and the machinability, and is suitable as a material for linear bearings, ball screws and roller bearings.

What is claimed is:

1. A steel for a corrosion-resistant rolling part consisting of:
   0.5% or more and 0.7% or less by weight of carbon,
   0.1% or more and 1.5% or less by weight of silicon,
   0.1% or more and 2.0% or less by weight of manganese,
   3.0% or more and less than 6.0% by weight of chromium,
   0.05% or less by weight of phosphorus,
   0.03% or less by weight of sulfur, and
   0.0015% or less by weight of oxygen, with the balance being iron and unavoidable impurities.

2. A steel for a corrosion-resistant rolling part consisting of:
   0.5% or more and 0.7% or less by weight of carbon,
   0.1% or more and 1.5% or less by weight of silicon,
   0.1% or more and 2.0% or less by weight of manganese,
   3.0% or more and less than 6.0% by weight of chromium,
   0.05% or less by weight of phosphorus
   0.03% or less by weight of sulfur,
   0.0015% or less by weight of oxygen, and at least one of the following components:
   0.05% or more and 2.0% or less by weight of molybdenum and
   0.1% or more and 0.8% or less by weight of copper, with the balance being iron and unavoidable impurities.

3. A steel for a corrosion-resistant rolling part consisting of:
   0.5% or more and 0.7% or less by weight of carbon,
   0.1% or more and 1.5% or less by weight of silicon,
   0.1% or more and 2.0% or less by weight of manganese,
   4.0% or more and 5.5% or less by weight of chromium,
   0.05% or less by weight of phosphorus,
   0.01% or less by weight of sulfur, and
   0.0015% or less by weight of oxygen, with the balance being iron and unavoidable impurities.

4. A steel for a corrosion-resistant rolling part consisting of:
   0.5% or more and 0.7% or less by weight of carbon,
   0.1% or more and 1.5% or less by weight of silicon,
   0.1% or more and 2.0% or less by weight of manganese, 4.0% or more and 5.5% or less by weight of chromium,
0.05% or less by weight of phosphorus,
0.01% or less by weight of sulfur,
0.0015% or less by weight of oxygen, and at least one of the following components:
0.05% or more and 1.0% or less by weight of molybdenum and
0.2% or more and 0.8% or less by weight of copper, with the balance being iron and unavoidable impurities.

5. A rolling part made from a steel consisting essentially of:
0.5% or more and 0.7% or less by weight of carbon,
0.1% or more and 1.5% or less by weight of silicon,
0.1% or more and 2.0% or less by weight of manganese,
3.0% or more and less than 6.0% by weight of chromium,
0.05% or less by weight of phosphorus,
0.03% or less by weight of sulfur, and
0.0015% or less by weight of oxygen,
with the balance being iron and unavoidable impurities,
said rolling part being subjected to quenching and tempering to obtain a hardness of at least HRC 60.

6. A rolling part made from a steel consisting essentially of:
0.5% or more and 0.7% or less by weight of carbon,
0.1% or more and 1.5% or less by weight of silicon,
0.1% or more and 2.0% or less by weight of manganese,
3.0% or more and less than 6.0% by weight of chromium,
0.05% or less by weight of phosphorus
0.03% or less by weight of sulfur,
0.0015% or less by weight of oxygen, and at least one of the following components:
0.05% or more than 2.0% or less by weight of molybdenum and
0.1% or more and 0.8% or less by weight of copper,
with the balance being iron and unavoidable impurities,
said rolling part being subjected to quenching and tempering to obtain a hardness of at least HRC 60.

7. A rolling part made from a steel consisting essentially of:
0.5% or more and 0.7% or less by weight of carbon,
0.1% or more and 1.5% or less by weight of silicon,
0.1% or more and 2.0% or less by weight of manganese,
4.0% or more and 5.5% or less by weight of chromium,
0.05% or less by weight of phosphorus,
0.01% or less by weight of sulfur, and
0.0015% or less by weight of oxygen,
with the balance being iron and unavoidable impurities,
said rolling part being subjected to quenching and tempering to obtain a hardness of at least HRC 60.

8. A rolling part made from a steel consisting essentially of:
0.5% or more and 0.7% or less by weight of carbon,
0.1% or more and 1.5% or less by weight of silicon,
0.1% or more and 2.0% or less by weight of manganese,
4.0% or more and 5.5% or less by weight of chromium,
0.05% or less by weight of phosphorus,
0.01% or less by weight of sulfur,
0.0015% or less by weight of oxygen, and at least one of the following components:
0.05% or more and 1.0% or less by weight of molybdenum and
0.2% or more and 0.8% or less by weight of copper,
with the balance being iron and unavoidable impurities,
said rolling part being subjected to quenching and tempering to obtain a hardness of at least HRC 60.

* * * * *